Nov. 28, 1939.  J. T. ROWELL  2,181,768
APPARATUS FOR CARBONATING WATER
Filed Sept. 9, 1935  6 Sheets-Sheet 1

INVENTOR.
John T. Rowell
BY Wood & Wood
ATTORNEYS

Nov. 28, 1939.  J. T. ROWELL  2,181,768
APPARATUS FOR CARBONATING WATER
Filed Sept. 9, 1935   6 Sheets-Sheet 2

INVENTOR.
John T. Rowell
BY Wood & Wood
ATTORNEYS

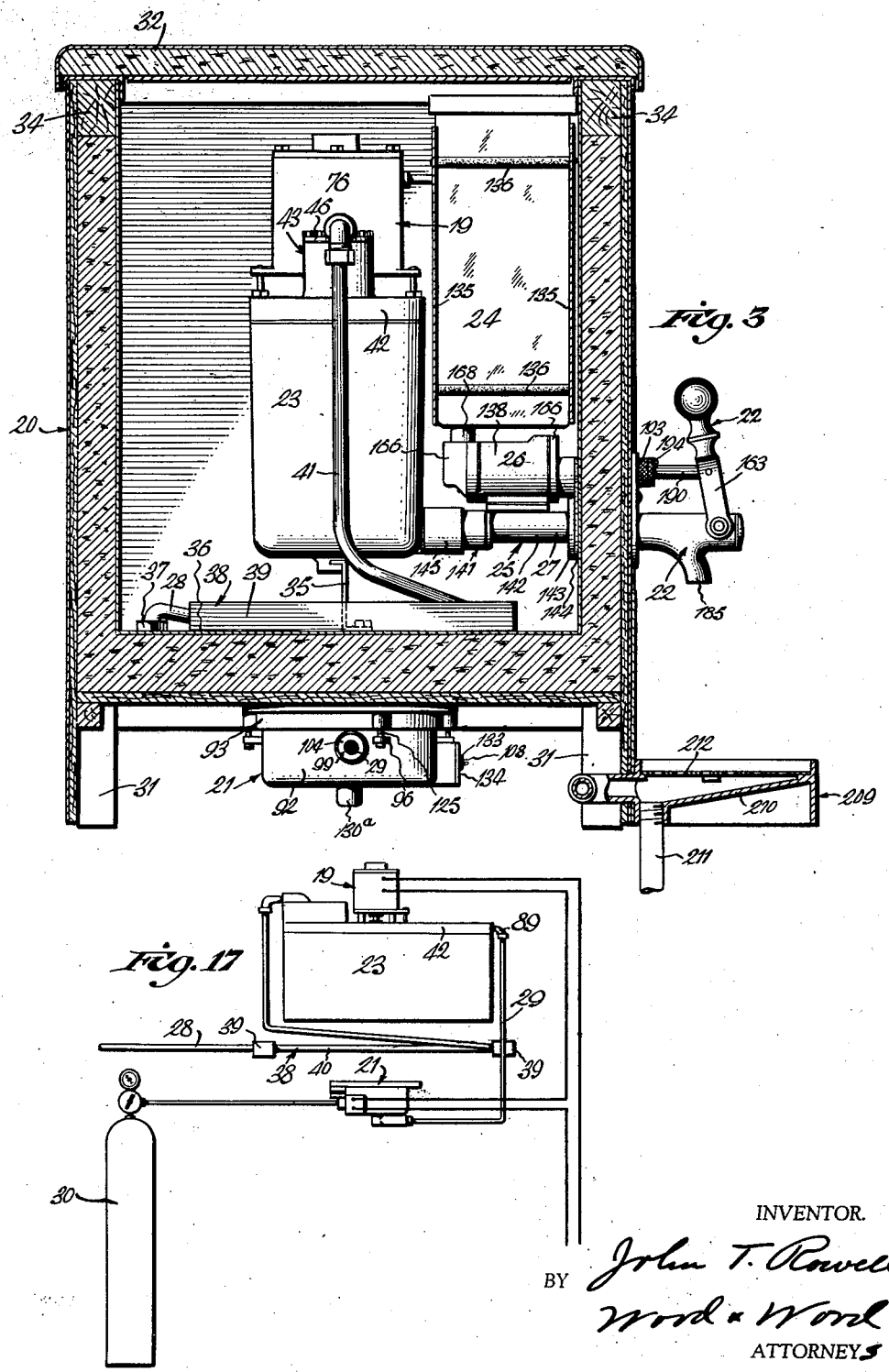

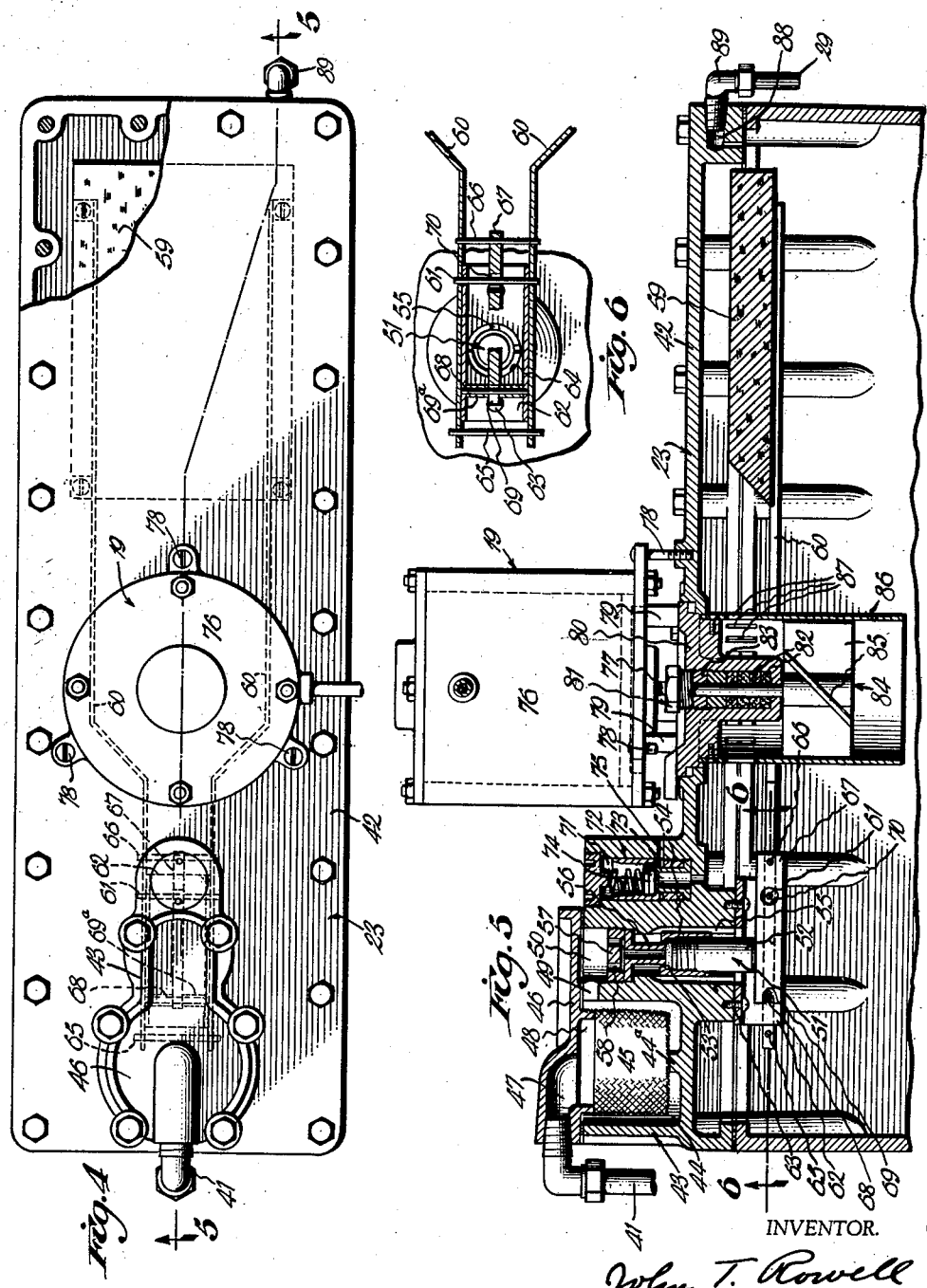

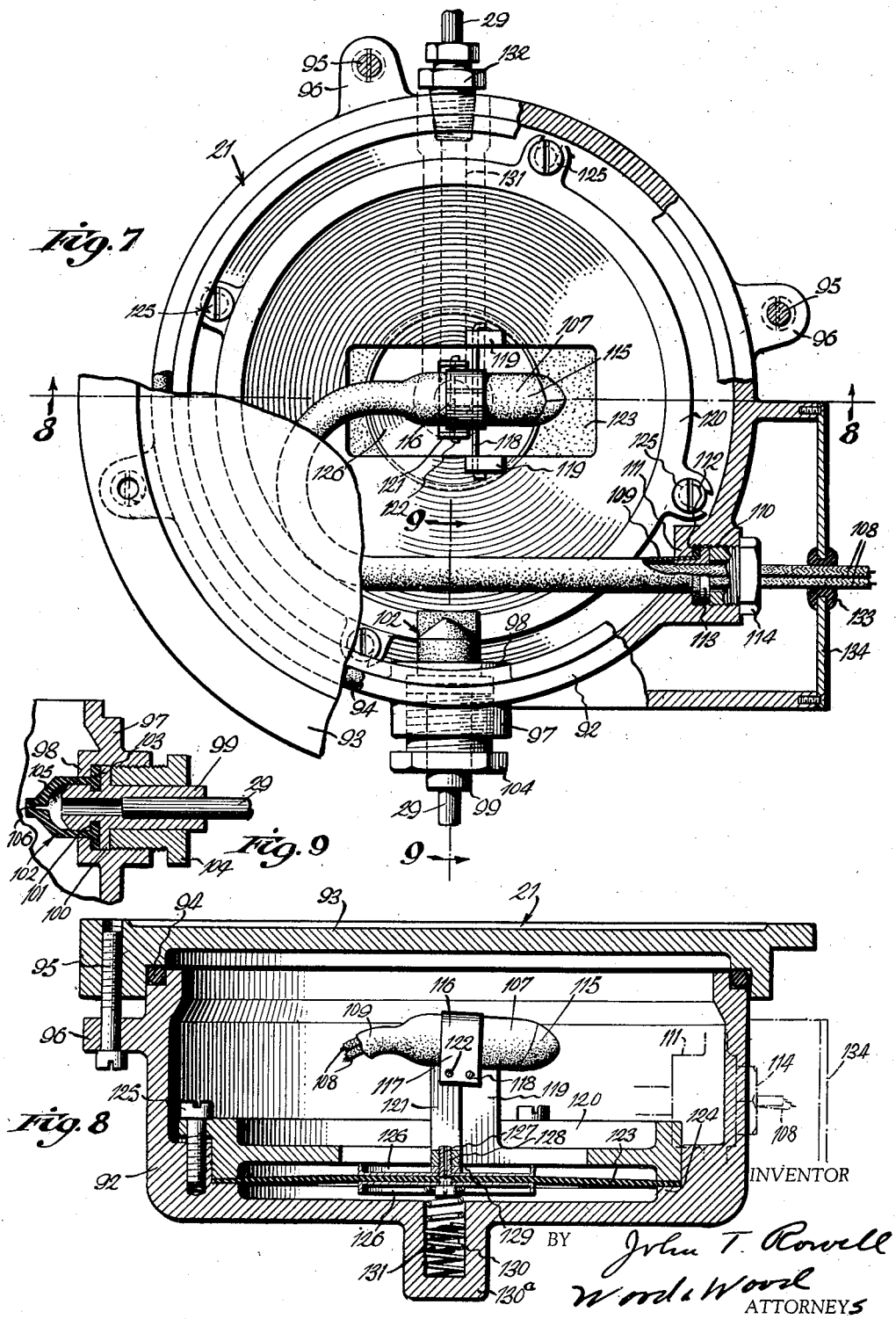

Nov. 28, 1939.  J. T. ROWELL  2,181,768
APPARATUS FOR CARBONATING WATER
Filed Sept. 9, 1935  6 Sheets-Sheet 6
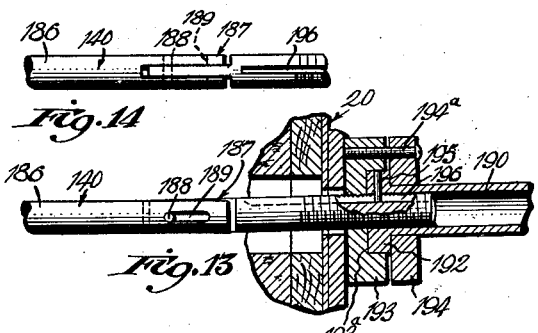
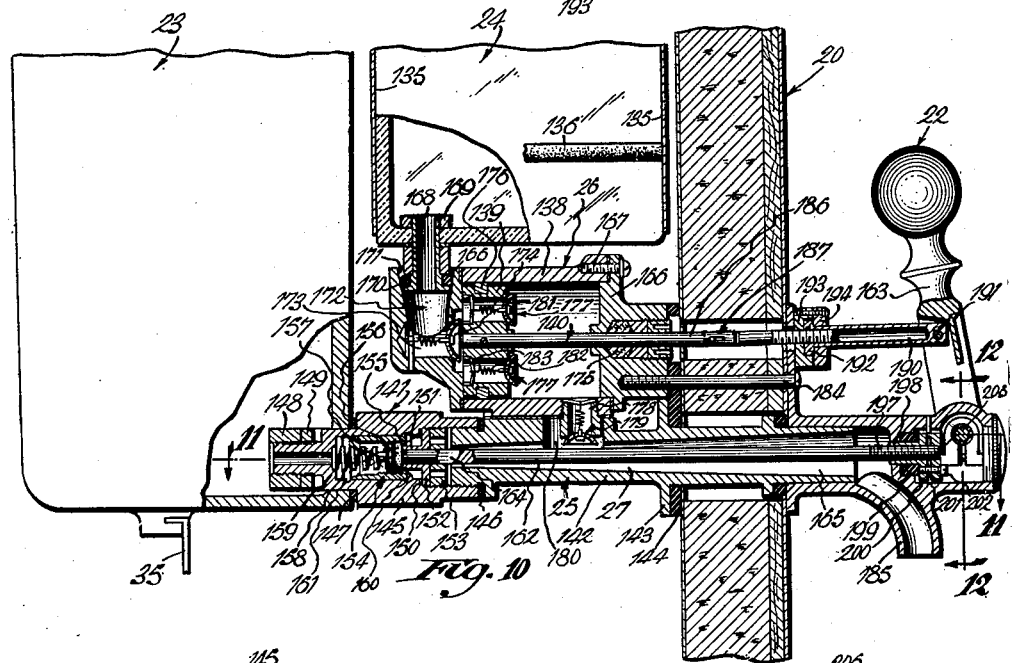
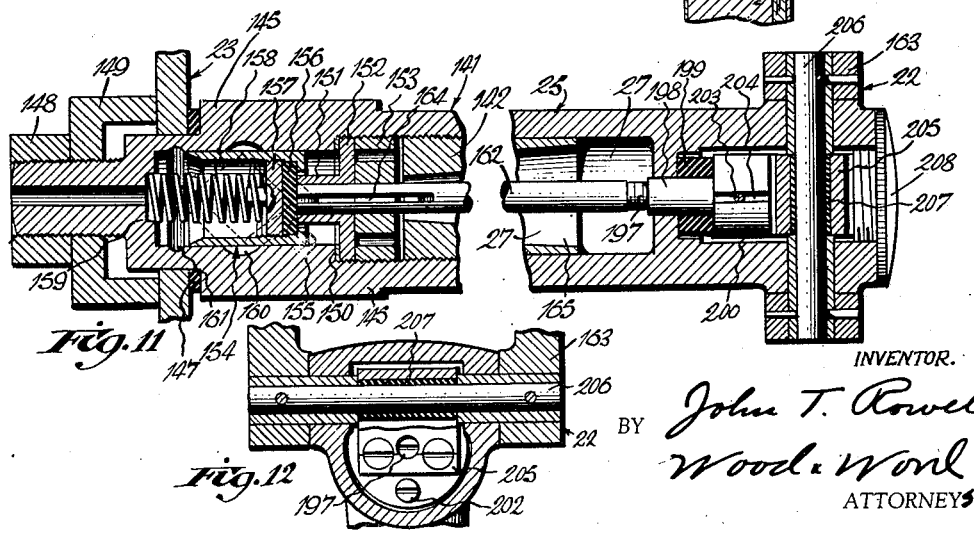
INVENTOR.
John T. Rowell
BY Wood & Wood
ATTORNEYS Patented Nov. 28, 1939

2,181,768

UNITED STATES PATENT OFFICE 2,181,768

APPARATUS FOR CARBONATING WATER

John T. Rowell, Cincinnati, Ohio, assignor to The Bock Machine Company, Cincinnati, Ohio, a corporation of Ohio Application September 9, 1935, Serial No. 39,669

9 Claims. (Cl. 261—93)

This invention relates to apparatus for carbonating water.

It has been the object of the inventor to provide an apparatus for the purpose of carbonating water, in which the water is impregnated with the maximum amount of gas which it is capable of retaining at any predetermined pressure and at the prevailing temperature. There are incorporated as parts of the apparatus a water inlet control and a gas inlet control, each of which controls may be independent of the other. The purpose of the water inlet control is to admit the water periodically for maintenance of the water level. The inlet of gas is controlled by the pressure of the gas above the water. The gas pressure above the water is developed by excess gas over and above that which the water is capable of retaining. In this connection an agitator is used, the operation of which is caused by lowering of gas pressure. As long as the water will continue to absorb gas, the pressure will not rise to line pressure in the space above the water and the agitator will continue to agitate the water and mix it with the gas to cause impregnation thereof. As soon as the gas pressure above the water reaches line pressure approximately the agitation is discontinued.

The invention achieves maximum impregnation of the water with the gas after each drink is withdrawn from the apparatus since it is necessary that the water reach maximum saturation before the agitation will be stopped.

It is a further object of this invention to provide an improved and highly sensitive control unit for the purpose of permitting supply of gas to the carbonating chamber and at the same time to cause operation of the agitating means when the gas pressure above the water drops below a predetermined pressure. This unit is highly efficient and unaffected by the fact that it is electrically operated in the presence of water, which fact normally tends to lower the efficiency of control units of this type. In a more specific sense the control unit may embody a mercury switch, which switch is acted upon by a diaphragm control movement located between the constant pressure chamber of the supply and the variable pressure chamber in connection with the carbonating tank. The invention therefore further resides in the provision of an efficient sealing means for the mercury switch, whereby, despite its association with moisture and despite the fact that electricity must be conducted thereto through the walls of the chamber housing the same, the device is unaffected and its efficiency is maintained.

Other objects and further advantages will be more fully apparent from a description of the accompanying drawings, in which:

Figure 3 is a sectional view taken on line 3—3, Fig. 1, further illustrating the mechanism within the cabinet.

Figure 4 is a top plan view of the carbonating tank.

Figure 5 is a sectional view taken on line 5—5, Fig. 4, detailing the water and gas inlets to the carbonating tank and the agitating means associated therewith.

Figure 6 is a sectional view taken on line 6—6, Fig. 5, detailing the connection of the control float to the water inlet control valve.

Figure 7 is a fragmentary and partial sectional view taken horizontally, illustrating the pressure operated gas inlet control device.

Figure 8 is a sectional view taken on line 8—8, Fig. 7, further illustrating the control device.

Figure 9 is a sectional view taken on line 9—9, Fig. 7, illustrating the check valve at the gas intake for the pressure operated gas inlet control device.

Figure 10 is a fragmentary sectional view taken on line 10—10, Fig. 1, illustrating one of the mixing and dispensing devices embodied in the machine.

Figure 11 is a sectional view taken on line 11—11, Fig. 10, showing in enlarged detail the spigot mechanism for admitting the carbonated water to the mixing chamber.

Figure 12 is a sectional view taken on line 12—12, Fig. 10, illustrating, in enlarged detail, the connection of the spigot handle to the valve operating rod.

Figure 13 is a fragmentary sectional view enlarged out of Figure 10, detailing the adjustable flexible linkage between the spigot handle and the measuring unit of the mixing and dispensing device.

Figure 14 is a fragmentary top view of the pivotal connection in the linkage of Figure 13.

Figure 17 is a diagrammatic view illustrating the water, gas, and electric circuits involved in the apparatus.

Figure 1:
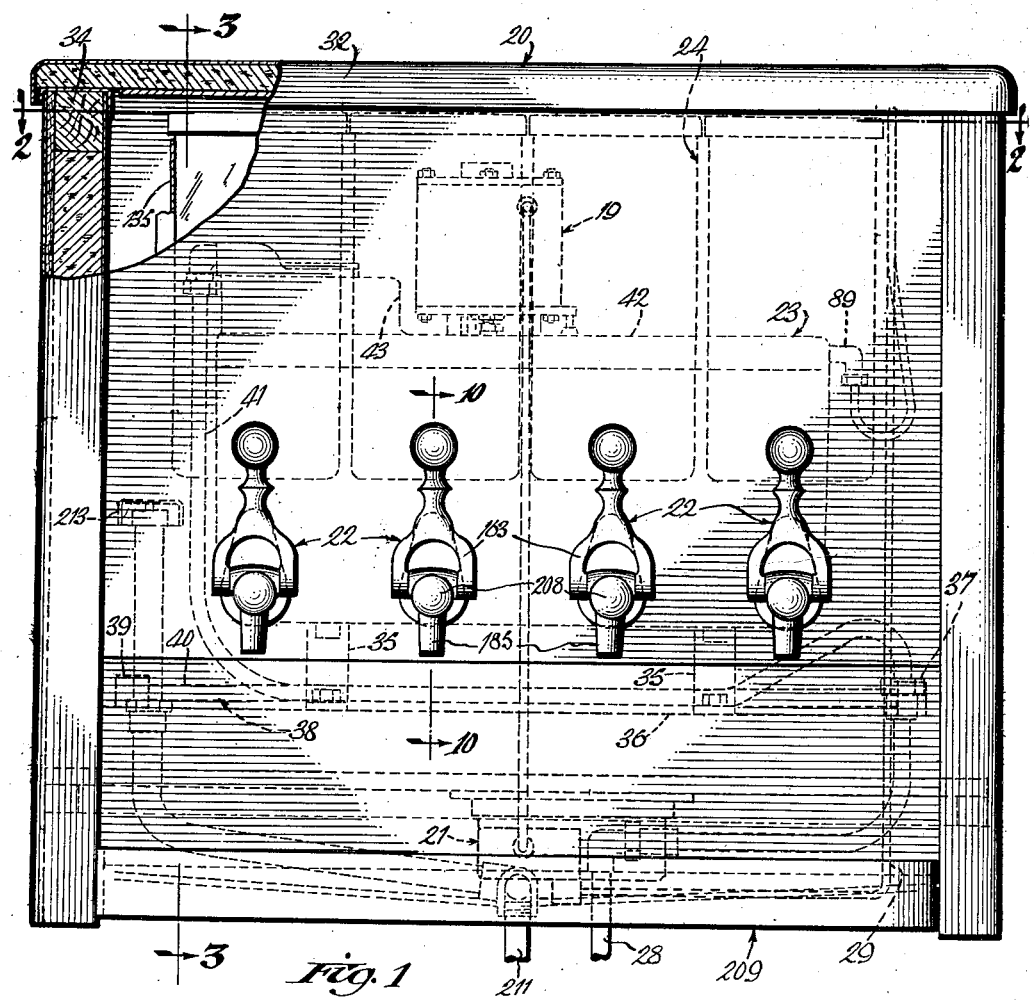
Figure 1 is a front view of the carbonating, mixing and dispensing machine of the present invention.
Figure 15:
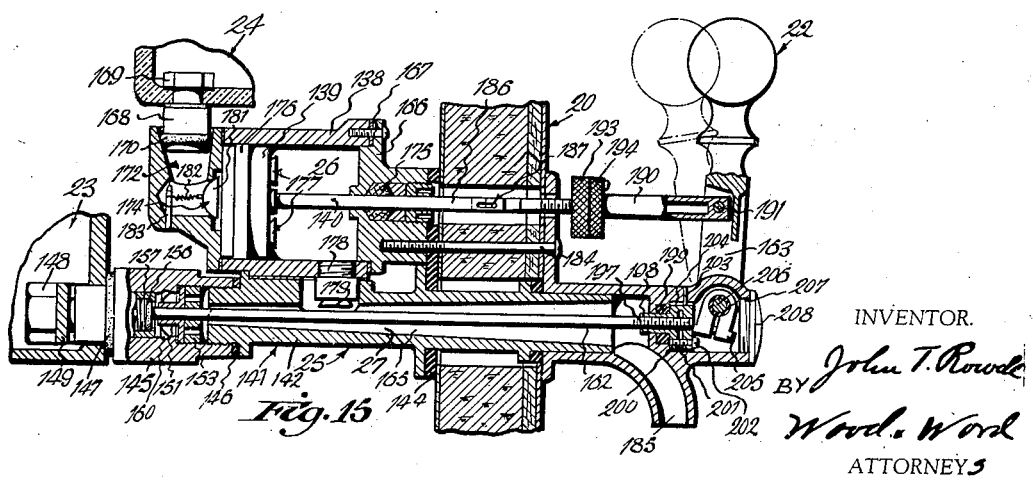
Figure 15 is a view taken similar to Figure 10, showing the spigot in position for obtaining carbonated water without syrup.

In the present disclosure of the invention, a cabinet 20 is provided, housing preferably all of the units with the exception of the gas pressure operated control device 21 for the agitator means 19. The cabinet structure provides a plurality of taps or faucets 22, each of which is designed to draw off a particular beverage or flavored drink. The apparatus within the container provides a carbonating unit 23, a plurality of syrup tanks or reservoirs 24 each having a faucet 22, and a dispensing unit 25 for each syrup tank including a measuring chamber and device 26, and a mixing chamber 27 from which the compounded beverage is delivered through the particular faucet or cock.

A water supply conduit 28 and a gas supply conduit 29 extend to the carbonating unit 23. The gas supply is provided by way of the gas pressure operated control device 21 for the agitator means. This control device includes a switch in electric circuit with the electric motor driving the agitator means, the switch, being diaphragm operated, depending on gas pressure fluctuation. The pressure on the intake side of the diaphragm is constant since the gas pressure is supplied from a carbonic gas supply tank 30. The other side of the diaphragm is in communication with the region over the float controlled water in the carbonating tank and the pressure therein, normally the same as that on the supply side, varies or drops as there is withdrawal of carbonated water. The cut-off or stopping of the agitator means occurs when the water has absorbed all the gas which it can contain, at which time the pressure above the water rises and the switch acts to stop the motor by equalization of the pressures on the respective sides of the diaphragm.

More specifically, the cabinet structure is composite being fabricated of wood, metal, and cork. It is believed unnecessary to describe the exact structural details of the cabinet except to say that inner and outer linings of metal are provided with heavy slabs of cork therebetween providing an insulated chamber in which ice may be packed for cooling the ingredients of the beverage to be dispensed. At this point it may be stated that carbonation takes place best under cooled conditions, that is to say, the water will absorb more gas when its temperature is low.

Figure 2:
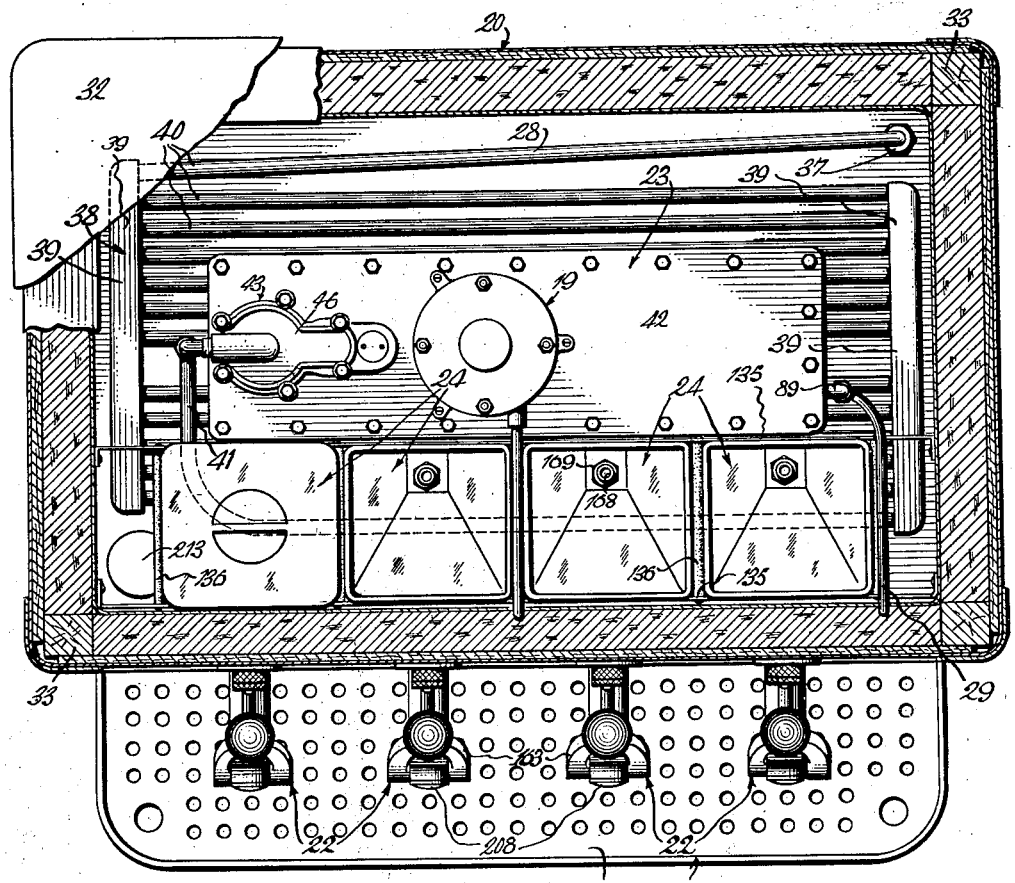
Figure 2 is a sectional view taken on line 2—2, Fig. 1, illustrating the mechanism within the cabinet of the machine.
Figure 16:
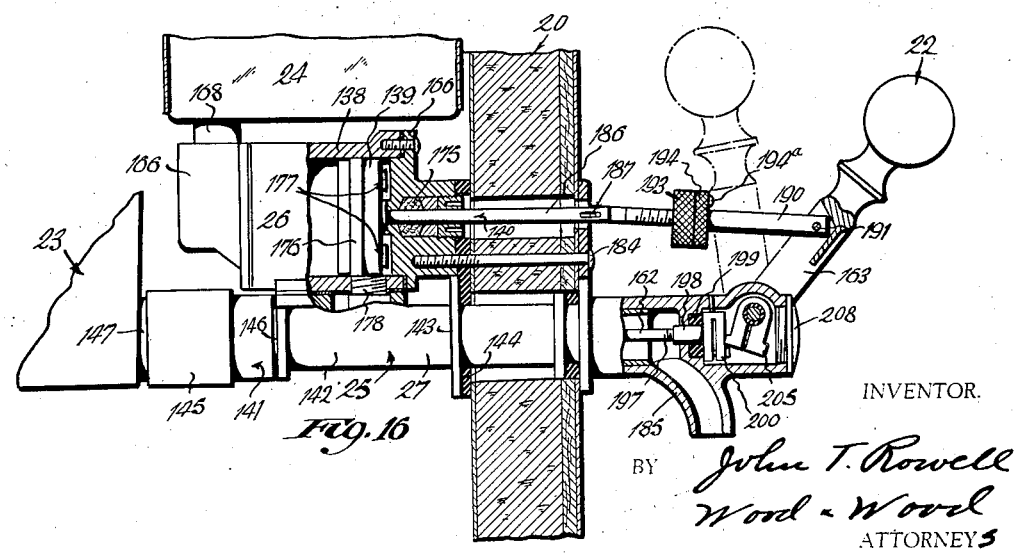
Figure 16 is a view taken similar to Figure 10, but illustrating the spigot in position after having delivered a quantity or charge of syrup sufficient for a drink, the delivery mechanism still in position for delivering carbonated water.

The composite frame structure is provided with legs 31 and incorporates a removable top 32. As shown in Figures 1, 2, and 3, wood uprights 33 and cross pieces 34 are incorporated for strengthening and rigidifying the cabinet structure.

The carbonating tank is mounted on angle iron brackets 35 secured to the floor 36 of the cabinet. The position of the carbonating tank 23 is substantially in the center of the cabinet. The water intake is by way of the pipe 28 entering the cabinet through the bottom thereof. A coupler 37 is provided at the point of entry into the cabinet, whereby the pipe may be in sections respectively above and below the cabinet floor. A cooling coil unit 38, lying in horizontal position, is secured to the floor of the cabinet. The coil consists of headers 39 and a series of connecter pipes 40 betwen the headers. The intake pipe 28 is connected to one end header 39 of the unit. The coil outlet pipe 41 is connected to the other header 39 of the unit and extends to the top of the carbonating tank.

The upper end of the carbonating tank is detailed in Figures 4 and 5. All of the connections and operating mechanisms within the carbonating tank are suspended from a removable top 42 thereof. A heavy boss 43 is provided in the closure or top element toward one end thereof. This boss projects upwardly from the plane of the top. The boss includes three chambers, all of which are cylindrical and have their axes vertically disposed. The first of these chambers, namely 44, is the largest and is the water filtering chamber. It has a closed lower end and incorporates a central boss 44ª supporting a cup-shaped screen element 45. A top closure 46 is provided for this filtering chamber, the water inlet pipe 41 being connected to an intake passageway 47 extending through the closure or cap element into the filtering chamber. This closure element includes an annular flange or cylindrical extension 48 downwardly disposed therefrom, the cup-shaped screen having its upper edge margin disposed about this flange.

Toward the upper end of this chamber 44 a radial passageway 49 enters the second of the chambers, namely the valve chamber 50. The water inlet valve 51 is float controlled. The valve element consists of a plug 52 slidably mounted in the vertical bore of the chamber. A leather seating disc 53 is fixed on the upper end of the plug. A disc retaining sleeve 54, screwed on the upper end of the plug and having an annular flange, overhangs the margin of the disc and holds it in place. The sleeve is of substantial length and provides the sliding portion of the valve. The bore in which this valve 51 slides includes longitudinal slots 55 for the passage of water, these slots extending above and below the plug and providing entry into the carbonating chamber.

The valve operates in relation to a seat 56 which is in the nature of a tube, of slightly less diameter than that of the packing disc, having an attaching flange or head lying on a shoulder of the valve bore formed by counterturning. This seat element is secured in position on the shoulder by means of a screw-threaded disc 57. This disc 57 is disposed below the radial passageway 49 entering the valve bore from the water filtering bore or chamber. Longitudinal passageways 58 in the disc enter a concavity on the underside of the plug, which concavity communicates with the tubular seating element. Accordingly the water is free to pass through these parts to the top of the plug and when the plug is away from the lower end of the tubular valve seating element it may then pass into the carbonating chamber.

A cork float 59 is provided for controlling the valve 51. The float consists of a flat slab of cork horizontally disposed. The float structure includes arms 60 on the outer ends of which the slab is mounted. These arms extend generally parallel and approach each other at the pivot rods. The ends of these arms 60 are pivotally mounted on a cross pin 61 between the valve and the float. This supporting or pivoting pin 61 is secured in the side arms of a channel-shaped bracket element 62 secured to the underside of the top of the tank by means of screws 63. The channel-shaped support bracket includes an aperture 64 about the plug providing ample clearance for the passage of water from the valve bore.

A pin 65 connects the outer ends of the arms

60. Another pin 66 between the pivot pin 61 and the float 59 extends between the arms and through one end of a valve contact lever 67. This lever is in constant engagement with the lower rounded end of the valve plug 51 intermediate the ends of the lever. A pivot pin 68 for this lever is fixed between the arms of the channel-shaped bracket 62 and traverses a slot 69 cut into the end of the lever 67. Spacer sleeves 69ª surround this last mentioned pivot pin 68 between the arms of the bracket and the lever for maintaining the lever in centralized position for positive engagement with the end of the valve plug.

The previously mentioned pivot pin 61 for the arms of the float extending through all of the parts, traverses a large clearance opening 70 in the lever. The relationship of the last named pin and the aperture in the lever is such as to permit appropriate float induced movement of the lever, but at the same time limit the movement of the float.

It will be apparent that, as the float moves down pivoting on its pivot rod 61, this movement is conveyed to the valve control contact lever 67 through the outermost pin 66, thus swinging the valve control lever downwardly on its pivot pin 68. This permits downward and opening movement of the valve. A very delicate valve movement is thus achieved so that refilling of the tank occurs periodically as the water level tends to drop.

The third chamber, namely, 71, incorporated in the closure, includes a safety valve 72 permitting release of gas in the gas chamber at the top of the carbonating tank in the event of excessive pressure. This valve can be of any standard construction and for this reason is not described in detail. Its principal elements consist of a fixed tube 73 communicating with the carbonating tank, a spring pressed valve 74 of disc form engaged on the upper end of the tube, and an outlet port 75 extending laterally from the region adjacent the contacting surfaces of the valve and seat.

The agitator unit 19 is also mounted on the closure means or top plate 42 of the carbonating tank. An electric motor 76, having its shaft 77 disposed vertically, is secured to the top surface of the closure plate by means of screws 78, drawing the legs 79 of the motor assembly down onto the closure. The shaft of the motor extends through a removable bearing or bracket 80 of the cover for the carbonating tank through a suitable gland 81. The gland 81 consists of a plurality of leather discs 82 compressed about the motor shaft by means of a packing gland screw 83 surrounding the motor shaft. The packing is contained in the bore of the bearing 80 depending from the closure or carbonating tank cover 42. Since a portion of the packing is disposed below the normal level of the water there is no opportunity for escape of gas along the motor shaft.

A rotary agitator element 84, including elevating blades or vanes 85, is secured to the lower end of the shaft. A cylinder 86 surrounds the agitator element and is secured about the circular bearing element 80 of the carbonating tank cover. A plurality of radial discharge openings 87 are provided in this cylinder above the agitator element. The blades of the agitator element are placed at the proper angle for elevating the water, drawing it upwardly through the cylinder and discharging it through the discharge openings 87.

The cylinder has its intake end disposed below the surface of the water, whereas the discharge openings open into the gas chamber above the water. Thus it will be observed that the action of the agitator means is to draw the water upwardly through the cylinder and eject it violently and under considerable pressure through the openings, spraying it in every direction throughout the gas filled chamber. The water thus becomes thoroughly impregnated with the gas. This action continues as will be brought out later until the water has absorbed the maximum amount of gas which it is capable of carrying.

The gas inlet 88 is at the opposite end of the cover from the water inlet. An angular nipple 89 is screwed into the end of the cover and enters the inlet bore 88 which has an angular extension entering the upper part of the carbonating tank. As shown in the diagrammatic view, the carbonic gas is supplied from a standard tank 30 by way of the piping 29 to the nipple 89 mentioned heretofore.

In the line of piping the control mechanism or gas pressure operated agitator control device 21 is embodied. This device is detailed in Figures 7 to 9 inclusive, and is preferably attached to the underside of the cabinet where it is not in the presence of the liquids in the cabinet.

The body of the unit 21 is in two parts. One of these, namely 92, is cup-shaped and the other, namely 93, constitutes the cover for the first. Suitable packing 94 is provided between the cover and main casing element. The cover is held in position by means of screws 95 passing through lugs 96 in the cup-shaped casing element and entering the cover.

A bored lug 97 is provided at one side of the casing. The bore is counterbored to provide a shoulder 98.

A coupling element 99 is fixed on the end of the tube 29 extending to the supply tank. This coupling element 99 incorporates an annular flange 100 and an annular groove 101 adjacent the flange. A rubber check valve element 102 is secured against the annular flange and within the annular groove. The rubber element is bell-shaped and has an annular flange 103 corresponding to that of the coupling element 99. The rubber flange bears against the shoulder 98, formed by the counterbore, and is held thereagainst by means of a packing screw 104 surrounding the coupling element 99 screwed into the boss and engaging the flange 100 of the coupling element.

The check valve or bell-shaped rubber element 102 extends sufficiently beyond the inner end of the coupling element to provide a chamber 105 in communication with the pipe. The mouth of the check valve is constituted by a flattened portion including a slot 106. The rubber will expand upon the admission of gas to its interior, opening the slot and permitting flow of gas to the interior of the control unit. Back flow cannot occur since the bell-shaped element collapses upon failure of pressure within the same, the slot closing and prohibiting back flow.

As heretofore stated, a mercury switch 107 is used for controlling the motor. The leads 108 for this switch enter through the wall of the control device and are encased in a rubber tube 109 extended from the point of entry to and completely surrounding the mercury switch. For the purpose of the entry of the leads, the bore 110 provided in the wall of the casing is counterbored to provide a shoulder 111. The extreme outer end of the rubber casing or tube 109 is flanged as at 112 and lies against the shoulder 111 formed by the counterbore. A flanged nipple element projects into the tube and lies against the flanged end thereof. A packing screw 114 holds these parts in position against the shoulder 111.

The details of the mercury switch are not shown since the conventional unit is employed. The sheathing of the leads and entire mercury switch in the rubber casing or covering 109 is a feature of this invention and is, therefore, fully described.

The mercury switch element proper, which is, of course, glass with suitable contacts and mercury within the same, is inserted in the enlarged open end of the tube. This tube end is inclusive of a cup piece 115 split so as to conform to the contour of the switch tube end when in position. The tube is sealed by means of this cup piece which is vulcanized at the point of switch insertion.

A metal strap 116 surrounds the rubber sheathed switch and provides arms 117 projecting downwardly and supported on a cross or pivot pin 118 fixed in arms 119 extended upwardly from a diaphragm clamping ring 120. The switch is tilted or actuated through a vertically disposed shiftable lever 121 fixed to the arms of the strap 116 by means of a cross pin 122 at its upper end in the same plane with the pin 118 and attached to the diaphragm at its lower end.

The lever 121 is U-shaped. The rubber diaphragm 123 is engaged on a shoulder 124 formed at the base of the chamber and thus divides the chamber. This diaphragm is held in position on the shoulder by means of the ring 120 fixed in position in the casing by screws 125. Centrally disposed discs 126, 126, are provided lying against opposite faces of the diaphragm and coaxially disposed relative thereto. An extremely small bore runs through the screw 128 for the purpose of providing, in this screw, a gas vent 127. This screw extends through the metal discs 126 and diaphragm 123 and the cross bar of the U-shaped lever 121. The entire assembly is maintained by means of a nut 129 screwed onto this gas vent element 128.

A coil spring 130 is disposed in the bore of a boss 130a in the bottom of the chamber for supporting the diaphragm at the center and, when the switch is off, assuming that the pressures on the respective sides of the diaphragm are equal, normally maintains the same in uppermost position. The spring assures the opening of the circuit to the agitating device when the pressures are balanced. An outlet 131 is provided extending transversely from the bore of the boss 130a of the chamber at the underside of the diaphragm and having the tube section 29 attached thereto by means of a coupling 132. As the pressure drops below the diaphragm the gas at line pressure moves the diaphragm downwardly, tips the mercury switch through the lever, establishes the contacts and starts the agitator device. Normally the gas pressures are equalized on either side of the diaphragm by way of the small bore in the center of the diaphragm. Sudden drop of pressure in the carbonating tank, as brought about by delivery of the drink or several drinks, lowers the water level and increases the space for gas, thus causing lower gas pressure, and agitator operation ensues. Operation of the agitator will continue until the pressures have become equalized by way of the passageway through the diaphragm, elevation of the diaphragm returning the mercury switch to reversely tilted position where the contacts are not established. As long as the water will continue to absorb the gas coming through the vent in the diaphragm the motor will continue to run. It is only upon failure of the water to take more gas and the building up of gas pressure above the water that the diaphragm will be returned by the spring because of equalization of pressures and will stop the agitator motor.

It will be noted that the control leads, extended from the switch to the motor, also pass through a rubber button 133 supported in a plate 134 forming a lid for a chamber about the point of entry of the leads into the central device. This forms a further seal and prevents twisting of the leads at the point of entry into the central device.

Any number of syrup tanks 24 may be employed. In the present instance there are four. Three of these are shown with the lids removed and the fourth with the lid in place. The syrup containers may be in the form of glass jars. To secure them in place, clamping plates 135 are provided, extended in parallelism and secured to the respective ends of the cabinet. Spacer and clamping rods 136 are extended between these side plates, the rods being rubber encased and disposed between the respective glass jars.

The dispensing devices for the jars being the same, the following description will be directed to one only.

In general, each unit includes a measuring device 26 incorporating a cylinder 138, a piston 139, and an operating rod 140. This measuring device is in communication with a mixing and carbonated water delivery assembly 141, the general nature of which is tubular. The mixing chamber is in the form of a long tube 142 secured through the forward wall of the cabinet. It includes a flange 143 lying against a rubber pad 144 engaged against the inner face of the forward wall of the cabinet.

Between this mixing tube 142 and the carbonating tank 23, a valve controlled outlet tube 145 is provided. This tube 145 is screwed onto the inner end of the mixing tube against a packing 146 and has its inner end lying against a packing 147 disposed against a forward face of the carbonating tank. A portion of the tube 145 extends into the carbonating tank. The associated tubes 142, 145 are secured in position by means of a nut 148 on the extreme inner screw-threaded end of the tube 145 engaging a U-shaped element 149 straddling the tube and contacting the inner face of the carbonating tank. This valve controlled outlet tube is counterbored to provide a shoulder 150.

The valve seat element 151 is tubular and includes an annular flange 152 lying against this shoulder 150 and held in position thereagainst by means of a screw plug 153. The valve 154 employed in this case comprises a sleeve slidably mounted in the main bore of the unit and including an inturned annular flange 155 at its forward end. A disc or contact element 156 for the valve is secured against this flange by means of a screw plug 157. A coil spring 158, under compression between a second shoulder 159 of the bore and the valve unit, maintains the valve against the tubular seat element 151.

Spirally laid grooves 160 in the bore of the tube 145 adjacent the sliding valve element provide communication from the inner end of the bore to the region adjacent the actual valve seat. An annular groove 161 is provided beyond the inner end of the valve element, which groove is in communication with the spirally laid grooves at all times. Ample clearance is provided, between the inturned flange 155 of the valve element and the tubular valve seat element 151, to permit flow of carbonated water from the inner end of the spirally laid grooves therethrough and to the region of the valve seat.

The valve is unseated by means of a long actuating rod 162 in contact with the same and slidably mounted through the tubular valve seat element 151 and bored plug 153. This rod is actuated by means of a lever 163 at the outer end of the cabinet. To provide for flow of the carbonated water after passage between the seats, the rod 162 is diametrically slotted from its inner end to a point beyond the plug 153 as at 164. The bore 165 of the mixing chamber is tapered, enlarging toward the forward end. Its inner end is of slightly larger diameter than the rod so that the carbonated water can pass from the slot 164 into this tapered bore.

Immediately above the mixing tube, the cylinder 138 of the syrup measuring and delivery unit is mounted. This cylinder includes heads 166, 166 at the respective ends, which parts are secured together by means of screws 167. The syrup container 24 includes a nipple 168 held in position through the bottom of the container by means of nuts 169. The lower end of the nipple is flanged and a packing 170 is secured between the flange and one of the nuts. The packing projects beyond the headed end of the nipple and provides a seal for the nipple when the removable container 24 is lowered into its bracket. The packing is engaged in a tapered bore 171 of a passageway 172 formed laterally in the rear head of the cylinder.

The rear cylinder head includes an axial extension 173 from this lateral passageway 172 entering the cylinder and controlled by means of a check valve 174. The piston 139 provided in the cylinder is operated by means of the piston rod 140 extended through the other head of the cylinder and appropriately sealed therein by means of a packing gland 175. A piston ring 176 is included in the piston. Valves 177, 177 are also incorporated therein.

The outlet from the cylinder is at the forward end thereof and extends laterally by way of a nipple 178 incorporating a valve 179, the nipple entering a lateral passageway 180 of the mixing tube 142. The valves employed are all of the same construction. The valve elements proper are cup-shaped discs 181 held against the respective seats by means of tension springs 182 attached to cross pins 183 in the passageways.

The forward movement of the piston discharges the syrup from the cylinder since the valves 177, 177 in the piston close and the valve 179 in the nipple 178 leading to the mixing chamber opens. At the same time the valve 174 in the head controlling the passageway from the syrup chamber opens and the suction action of the piston is effective for drawing in another charge of syrup in back of the piston. The return stroke of the piston closes the valve 174 in the syrup passageway and opens the valves 177 in the piston, whereupon the charge moves from the back of the piston to the forward side for delivery to the mixing chamber upon the next forward movement of the piston.

A screw 184, extended through the cabinet wall into the forward cylinder head, holds these parts rigidly against the forward wall of the cabinet.

The faucet 22 is secured to the front of the cabinet by means of the screw 184 heretofore described. This faucet 22 telescopes over the extended end of the mixing tube and includes the usual downwardly extended discharge spout 185. The operating rod 140 for the syrup measuring and discharging piston is sectional. The main part 186 extends through the packing gland 175 and is jointed intermediate its length outside the gland. The joint consists of a tongue and groove connection 187. A pin 188 is fixed in the tongue diametrically in relation to the rod and projects into longitudinal slots 189 in the arms of the grooved rod so as to permit relative limited longitudinal movement of the sections. The outer end of this rod is screw-threaded and has a headed sleeve section 190 screwed thereon.

The lever 163 is pivoted on the faucet and extends upwardly having the outer end of the sleeve section 190 of the piston operating rod 140 pivotally attached thereto by means of a cross pin 191. The headed inner end 192 of the sleeve section 190 (see the details of Figure 13) is held against an adjustment nut 193 screw-threaded on the rod by means of a clamping ring 194. The head fits in an annular recess 193ª of the nut and the clamping ring is held against the head by means of screws 194ª.

The sleeve 190 includes a radially extended pin 195 having its inner end engaged in the longitudinal slot 196 in the screw-threaded end of the operating rod. Accordingly, upon loosening of the screws 194ª, the adjustment nut can be rotated on the screw-threads of the rod for changing the longitudinal position of the sleeve in relation to the rod section 140. Thus it is possible to vary the length of the operating rod 140 or the position of the lever or handle 163 with relation to the piston 139.

The outer end of the valve operating rod 162, which passes through the mixing chamber, includes a screw-threaded outer end 197 carrying a bushing 198 which bushing is in turn supported in the bore of the faucet and through a rubber spring pad 199. The rod 162 may be adjusted longitudinally in the bushing 198 for controlling flow of carbonated water being formed for this purpose with a slot in its outer end in which a screw driver may be inserted. The bushing includes a head 200 which has a transverse split 201, the portions of which are drawn together by means of a clamping screw 202. The screw draws the portions together transversely of the threads of the rod and clamps the rod 162 against longitudinal and rotative movement.

A spline means is provided for preventing rotative movement of the rod 162 and bushing or contact element 198 in the form of a pin 203 in the faucet projecting into a longitudinal slot 204 in the head of the element. The head 200 of the element bears directly against the compressible pad 199, thus permitting a limited amount of longitudinal movement, sufficient to unseat the valve. The pad acts to return the element to normal position when the handle is returned. This movement is imparted by means of an arm 205 frictionally fixed on the pivot shaft 206 for the operating handle 163, the shaft being fixed to the operating handle. The frictional attachment is accomplished by means of a rubber bushing 207 about which the lever is clamped, enabling operation of the rod through the lever until a certain pressure is reached, at which time the rotative connection between the lever and the operating arm is broken and further outward swing of the lever may continue.

The outer end of the bore of the faucet apart from the spout is closed by means of a plug 208 which serves as an abutment for the operating arm 205 when the operating lever for the faucet is returned.

The first phase of outward movement of the lever from the position shown in Figure 10 does not affect the position of the syrup dispensing piston because of the slotted connection with the tongue and groove portions of the rod sections. The movement thus permitted is effective for opening the water valve. It is thus possible for the operator to dispense carbonated water without syrup. However, for dispensing a single drink the operator swings the lever the entire distance, in the first phase, opening the carbonated water valve and, in the second phase, discharging a measured amount of syrup into the mixing chamber, into the stream of carbonated water passing through the mixing tube. Thus the ingredients are thoroughly compounded and mixed in the process of delivery through the faucet.

If the operator wishes to add further carbonated water other than that brought about during the forward movement of the handle he continues to hold the handle in its outmost position, it being apparent that the valve for the carbonated water will continue to remain open as long as he does not release the lever.

A drainage and support tray 209 is secured to the part of the cabinet below the faucets. This tray includes a sloping surface 210. A drain pipe 211 depends from the lowest point of the tray. A grill 212 for supporting the glasses is provided, countersunk in the tray over the inclined surface thereof.

Since ice is packed in the cabinet about the carbonated water tank, syrup tanks, and water cooler coil, it is necessary to provide for drainage of the water resulting from melting ice. For this purpose an overflow pipe 213 is provided extended upwardly into the cabinet through the floor thereof. The outer end of this pipe connects to the drainage tray 209 adjacent the lowest point of the sloping surface thereof.

Having described my invention, I claim:

1. In a machine of the class described an apparatus for carbonating water, comprising, a tank for the water, a water supply conduit connected to said tank, a float controlled valve controlling the flow of water from said conduit into said tank and the water level therein, an agitator device mounted on said tank and extended below the water level thereof, a source of carbonic gas supply, a conduit extending from said supply to said tank, a motor for driving the agitator device at a constant speed, and a gas pressure controlled unit in said gas conduit for controlling said agitator driving means.

2. In a machine of the class described, an apparatus for carbonating water, comprising, a tank, means for maintaining a certain amount of water in said tank, means for agitating the water, a motor for driving said agitator means at a constant speed, a gas supply conduit connected to said tank adapted for constantly supplying gas above the water in the tank, and a gas pressure controlled device in the gas conduit for controlling the operation of the agitator driving means.

3. A water carbonating apparatus for use in a dispensing cabinet, comprising, a water tank supported in said cabinet, a water supply conduit extending into the cabinet and to the tank, said water conduit including a cooling coil disposed within the cabinet, valve means in said conduit at the point at which it enters the tank, said valve means controlled by the water level in the tank for maintaining the level, a carbonic gas supply conduit extended to said tank, an agitator means, power means for driving the agitator constantly at a speed sufficient for fully agitating the water, and a gas pressure operated control means for the power means effective for stopping the agitator means when the pressure in the tank over the water equals gas line pressure.

4. In a carbonating apparatus, a tank for carbonating water, a water supply conduit for delivering the water to said tank, flow control means for controlling the delivery of water to the tank to maintain a water level therein, an electrically driven agitating device mounted on the tank, a gas supply conduit extended to the tank, a control unit incorporated in the gas conduit including a mercury switch and a pressure responsive diaphragm for operating said switch including a passage way for constant passage of gas therethrough at a restricted rate of flow, and electrical wiring extending between the agitator device and the switch.

5. In a carbonating apparatus, a water tank, electrically driven agitating means for agitation of the water within the tank, means for supplying water to the tank and maintaining a predetermined level, a carbonic gas supply conduit extended to the tank, a chamber embodied in said conduit, a diaphragm in said chamber interposed between sections of the conduit, said diaphragm including a gas flow aperture permitting restricted flow of gas, a switch operated by dilation of said diaphragm, and electrical leads connecting the switch and electrically driven agitating means in circuit.

6. In a carbonating apparatus a water tank, a lid for said tank, said lid incorporating an agitator device depending into the water, a motor for driving said agitator device, a water supply conduit connected to a passageway in said top extending therethrough, a valve in the passageway, a float for opening and closing said valve, a gas supply conduit connected to said top and a motor control device disposed in the gas supply conduit, operative for starting the motor when the gas pressure over the water in the tank is less than the gas supply pressure, and stopping the motor when the gas pressures aforesaid are equal.

7. In a carbonating apparatus, a carbonating tank including a water connection and a gas connection thereto, valve means for controlling the supply of water to said tank, agitator means for agitating the water for impregnating the same with gas disposed above the water, a motor for driving said agitator means, means for withdrawing water from the tank, and control means for the motor for the agitator means disposed in the gas supply and operated by differential between gas pressure in the line and gas pressure above the water.

8. In a carbonating apparatus, a tank for gas and water, a water supply conduit extending to said tank and including a cooling coil, an agitator means in the tank, control means for the water supply conduit for maintaining a predetermined water level, a gas supply conduit connected to the tank, withdrawal means for removing carbonated water from the tank, a control unit incorporated in the gas supply conduit including a diaphragm, one side of which is subjected to the pressure of gas within the tank and the other to line pressure, a small orifice through said diaphragm permitting restricted flow of gas therethrough, and a control device operated by said diaphragm when the diaphragm dilates due to differential in pressure at the respective sides thereof.

9. In a carbonating apparatus, a tank, a conduit for delivering water to said tank, means for controlling the delivery of water to the tank for maintaining a constant level therein, an electrically driven agitator device associated with the tank, a gas supply conduit extended to said tank, a gas pressure controlled device in the gas conduit, and a switch for controlling the electrically driven agitator device, said switch operated by said gas pressure controlled device for starting and stopping the agitator device, said gas pressure controlled device effective for operating said switch for stopping the agitator device when the gas pressure over the water in the tank equals line pressure.

JOHN T. ROWELL.